United States Patent
Belakshe et al.

(10) Patent No.: US 10,626,322 B2
(45) Date of Patent: Apr. 21, 2020

(54) COMPOSITION FOR TREATMENT OF SUBTERRANEAN FORMATIONS

(71) Applicant: Halliburton Energy Services, Inc., Houston, TX (US)

(72) Inventors: Ravikant S. Belakshe, Pune (IN); Rajender Salla, Pune (IN); Ramesh Uppuluri, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/526,451

(22) PCT Filed: Dec. 10, 2014

(86) PCT No.: PCT/US2014/069464
§ 371 (c)(1),
(2) Date: May 12, 2017

(87) PCT Pub. No.: WO2016/093814
PCT Pub. Date: Jun. 16, 2016

(65) Prior Publication Data
US 2017/0327735 A1 Nov. 16, 2017

(51) Int. Cl.
*C09K 8/035* (2006.01)
*C09K 8/74* (2006.01)
*C09K 8/508* (2006.01)

(52) U.S. Cl.
CPC ............ *C09K 8/74* (2013.01); *C09K 8/035* (2013.01); *C09K 8/5086* (2013.01); *C09K 2208/32* (2013.01)

(58) Field of Classification Search
CPC . C09K 8/74; C09K 8/035; C09K 8/68; C09K 8/685; C09K 2208/32; C09K 8/72; C09K 8/90; C09K 2208/08; C09K 8/08; C09K 8/54; C09K 8/588; C09K 8/70; C09K 2208/20; C09K 2208/26; C09K 8/76; C09K 8/516; C09K 8/52; C09K 8/602; C09K 8/86; C09K 8/887; C09K 2208/00; C09K 2208/30; C09K 8/512; C09K 8/514; C09K 8/725; C09K 8/82; C09K 2208/10; C09K 2208/22; C09K 2208/24; C09K 8/00; C09K 8/60; C09K 8/64; C09K 8/882; C09K 8/92; C09K 2208/04; C09K 8/032; C09K 8/06; C09K 8/24; C09K 8/40; C09K 8/44;
(Continued)

(56) References Cited

U.S. PATENT DOCUMENTS

| 3,252,980 | A |  | 5/1966 | Bolmer et al. |
| 4,552,672 | A |  | 11/1985 | Walker |
| 5,336,441 | A |  | 8/1994 | Shah et al. |
| 5,797,456 | A |  | 8/1998 | Mokadam |
| 7,921,912 | B2 |  | 4/2011 | Saini et al. |
| 2005/0209107 | A1 | * | 9/2005 | Pursley ............... C09K 8/035 507/137 |
| 2007/0010404 | A1 |  | 1/2007 | Welton et al. |
| 2009/0042750 | A1 | * | 2/2009 | Pauls ................. C09K 8/74 507/213 |
| 2010/0202965 | A1 | * | 8/2010 | Hehir ............... A61K 49/0052 424/1.77 |
| 2013/0253213 | A1 | * | 9/2013 | Ikemizu ............. C07C 253/30 556/117 |

FOREIGN PATENT DOCUMENTS

| EP | 1278939 | 1/2014 |
| WO | 2006087525 | 8/2006 |

OTHER PUBLICATIONS

Gunaratne (H.Q. Nimal Gunaratne et al, Inic liquids for efficient hydrogen sulfide and thiol scavenging, Green Chemistry, 2014, 16, 2411-2417.*

(Continued)

*Primary Examiner* — Kumar R Bhushan
(74) *Attorney, Agent, or Firm* — Chamberlain Hrdlicka

(57) ABSTRACT

Various embodiments disclosed relate to acidizing compositions and methods of using the same for treatment of subterranean formations, wherein the acidizing compositions comprise an acid; and a compound having a structure chosen from: Formula (I, II), wherein $R^1$ at each occurrence is independently chosen from —H and substituted or unsubstituted $(C_1-C_{30})$hydrocarbyl, R2 at each occurrence is independently chosen from —CN, $CONR^4_2$, and —$COOR^4$, wherein $R^4$ at each occurrence is independently chosen from —H and substituted or unsubstituted $(C_1-C_{30})$hydrocarbyl, $R^3$ at each occurrence is independently chosen from substituted or unsubstituted $(C_1-C_{30})$hydrocarbyl, a substituted or unsubstituted $(C_1-C_{10})$heterocyclyl, and a (Ci-C3o)hydrocarbyl substituted by a substituted or unsubstituted $(C_1-C_{10})$ heterocyclyl and interrupted by 0, 1, 2, or 3 groups independently chosen from -0-, —S—, and substituted or unsubstituted —NH—, and M is a Michael-addition donor.

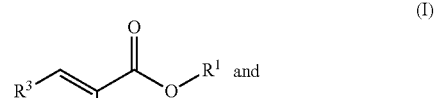

(I)

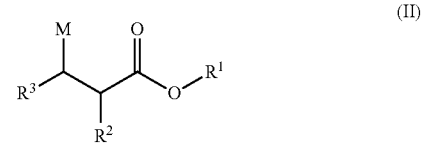

(II)

20 Claims, 1 Drawing Sheet

(58) Field of Classification Search
CPC ........ C09K 8/50; C09K 8/502; C09K 8/5086; C09K 8/575; C09K 8/584; C09K 8/592; C09K 8/32; C09K 8/36; C09K 8/508; C09K 8/532; C09K 8/536; C09K 8/582; C09K 8/66; C09K 8/703; C09K 8/80; C09K 8/805; C09K 8/845; E21B 43/26; E21B 41/02; E21B 21/062; E21B 17/00; E21B 41/00; E21B 43/25; E21B 43/267; E21B 21/063; E21B 36/008; E21B 43/16; E21B 43/24; E21B 10/00; E21B 21/003; E21B 21/06; E21B 21/08; E21B 33/068; E21B 33/13; E21B 33/138; E21B 37/06; E21B 43/04
See application file for complete search history.

(56) References Cited

OTHER PUBLICATIONS

International Search Report and Written Opinion of PCT Application No. PCT/US2014/069464 dated Sep. 10, 2015: pp. 1-12.
Anonymous, Compound ID: 736274, "ethyl 2-cyano-3-(3-pyridinypacrylate," National Center for Biotechnology Information, Pubchem Open Chemistry Database, retrieved May 9, 2017: pp. 1-12, <https://pubchem.ncbi.nlm.nih.gov/compound/736274>.
Anonymous, "MIOR—Microbial Improved Oil Recovery also known as MEOR—Microbial Enhanced Oil Recovery," Jun. 2006: pp. 1-27, <http://www.chemguide.co.uk/physical/catalysis/hydrolyse.html>.
Carey, Chapter 20: Carboxylic Acid Derivatives. Nucleophilic Acyl Substitution, "Reactions of Nitriles," Organic Chemistry fourth edition, retrieved May 9, 2017: pp. 1-7, <http://www.mhhe.com/physsci/chemistry/carey/student/olc/graphics/carey04oc/ref/ch20reactionsnitriles.html>.
Clark, "The Mechanism for the Acid Catalysed Hydrolysis of Esters," chemguide Helping you to understand Chemistry, 2002 (modified 2004): pp. 1-6.
Gunaratne et al., "Ionic liquids for efficient hydrogen sulfide and thiol scavenging," Green Chemistry, vol. 16, 2014: pp. 2411-2417.
Reyes et al., SPE 164380: "Carbonate Stimulation with Biodegradable Chelating Agent Having Broad Unique Spectrum (pH, Temperature, Concentration) Activity," SPE International, 2013: pp. 1-11.

* cited by examiner

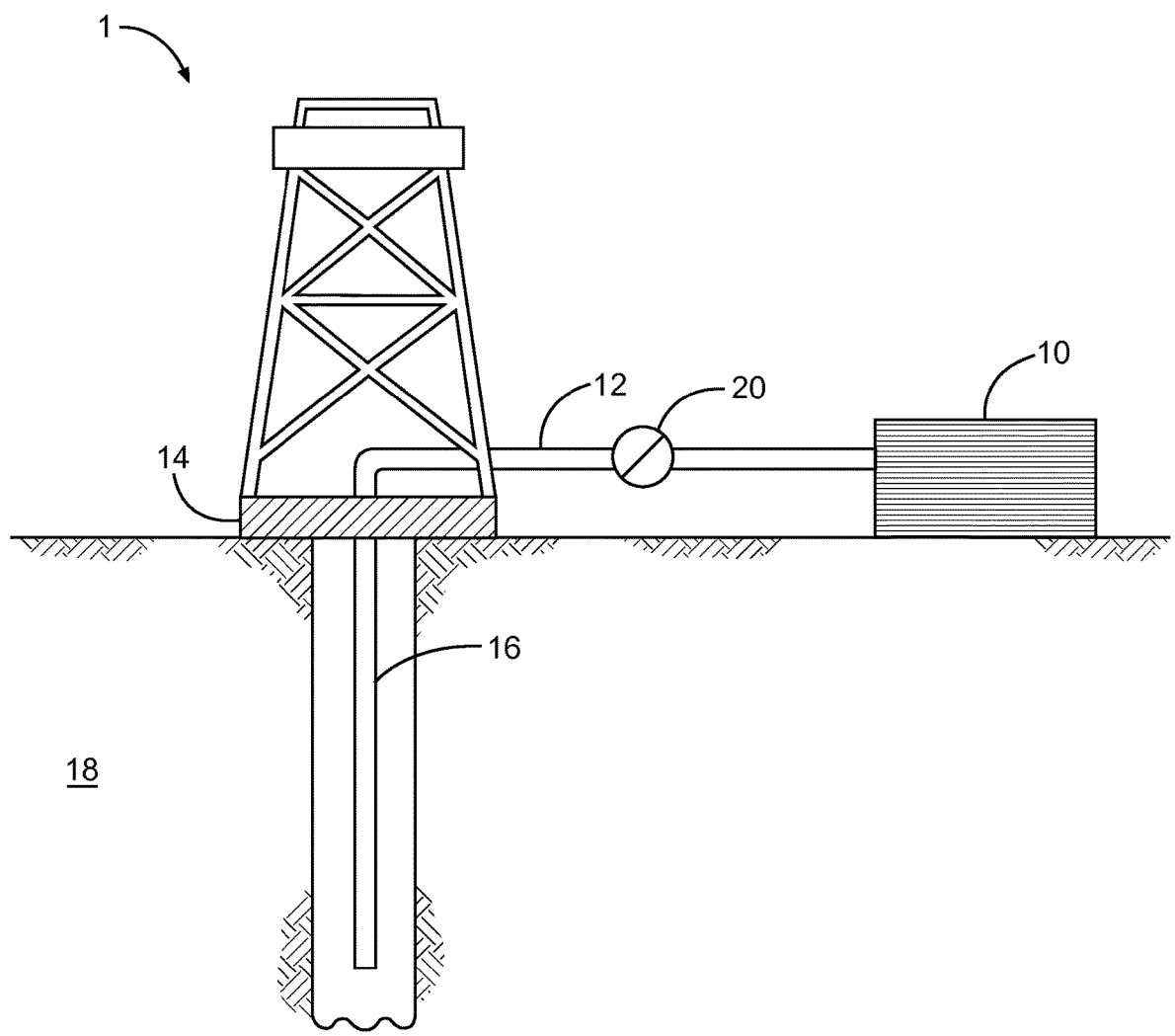

US 10,626,322 B2

COMPOSITION FOR TREATMENT OF SUBTERRANEAN FORMATIONS

BACKGROUND

Acids are used in subterranean formations in a variety of procedures to enhance hydrocarbon production such as stimulation, damage removal, and scale dissolution. For example, acids (e.g., hydrochloric acid, acetic acid, or formic acid) can be very effective for dissolving carbonate formations, thereby creating conductive channels. For sandstone damage removal, hydrofluoric acid along with hydrochloric or organic acid can be used. Sometimes the acids are used in the form of retarded acids such as gelled acids and emulsified acids.

Pumping such acids into subterranean formations can have negative consequences such as corrosion to metal equipment above surface and downhole, as well as sludge formation as a result of oil interaction with acid or with biproducts of acid-dissolution. Corrosion due to acids is a major parameter affecting the economics of wells; mineral acids in particular are more vigorous and corrosive as compared to organic acids. The high temperature environment of downhole acid use can increase the corrosion rate dramatically. The situation becomes more critical with presence of sour gas (e.g., $H_2S$) in the well, which can cause sulfide stress cracking in metal equipment. Besides metal corrosion, sour gas can also decrease cement sheath integrity and also have destabilizing effects on zonal isolation.

BRIEF DESCRIPTION OF THE FIGURES

The drawings illustrate generally, by way of example, but not by way of limitation, various embodiments discussed in the present document.

FIG. 1 illustrates a system or apparatus for delivering an acidizing composition to a subterranean formation, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety; for example, R can be hydrogen, alkyl, acyl, cycloalkyl, aryl, aralkyl, heterocyclyl, heteroaryl, or heteroarylalkyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes placing in a subterranean formation an acidizing composition. The acidizing composition includes an acid and a compound having a structure chosen from:

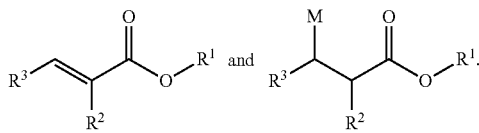

The variable $R^1$ at each occurrence is independently chosen from —H and substituted or unsubstituted $(C_1$-$C_{30})$hydrocarbyl. The variable $R^2$ at each occurrence is independently chosen from —CN, $CONR^A{}_2$, and —$COOR^A$, wherein $R^A$ at each occurrence is independently chosen from —H and substituted or unsubstituted $(C_1$-$C_{30})$hydrocarbyl. The variable $R^3$ at each occurrence is independently chosen from substituted or unsubstituted $(C_1$-$C_{30})$hydrocarbyl, a substituted or unsubstituted $(C_1$-$C_{10})$heterocyclyl, and a $(C_1$-$C_{30})$ hydrocarbyl substituted by a substituted or unsubstituted $(C_1$-$C_{10})$heterocyclyl and interrupted by 0, 1, 2, or 3 groups independently chosen from —O—, —S—, and substituted or unsubstituted —NH—. The variable M is a Michael-addition donor.

In various embodiments, the present invention provides a method of treating a subterranean formation. The method includes placing in a subterranean formation an acidizing composition including an acid and a compound having the structure:

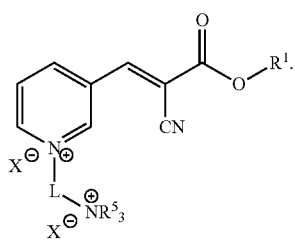

The variable $R^1$ is $(C_1$-$C_5)$alkyl. The variable L is $(C_1$-$C_{15})$alkylene. The variable $R^5$ is $(C_1$-$C_5)$alkyl. The variable $X^-$ at each occurrence is independently selected from halide.

Various embodiments of the present invention provide a method of treating a subterranean formation. The method includes placing in a subterranean formation a composition including a compound having a structure chosen from:

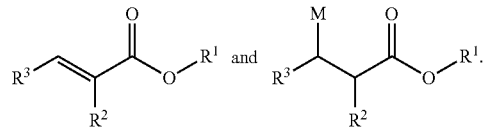

The variable $R^1$ at each occurrence is independently chosen from —H and substituted or unsubstituted $(C_1$-$C_{30})$hydrocarbyl. The variable $R^2$ at each occurrence is independently chosen from —CN, $CONR^A{}_2$, and —$COOR^A$, wherein $R^A$ at each occurrence is independently chosen from —H and substituted or unsubstituted $(C_1$-$C_{30})$hydrocarbyl. The variable $R^3$ at each occurrence is independently chosen from substituted or unsubstituted $(C_1$-$C_{30})$hydrocarbyl, a substituted or unsubstituted $(C_1$-$C_{10})$heterocyclyl, and a $(C_1$-$C_{30})$ hydrocarbyl substituted by a substituted or unsubstituted $(C_1$-$C_{10})$heterocyclyl and interrupted by 0, 1, 2, or 3 groups independently chosen from —O—, —S—, and substituted or unsubstituted —NH—. M is a Michael-addition donor. The method also includes dissolving or removing a filter cake in the subterranean formation with the composition or a reaction product thereof.

In various embodiments, the present invention provides a system. The system includes an acidizing composition including a compound having a structure chosen from:

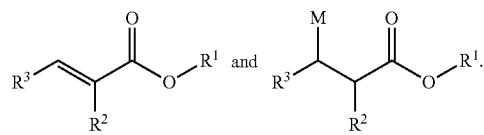

The variable $R^1$ at each occurrence is independently chosen from —H and substituted or unsubstituted $(C_1$-$C_{30})$hydrocarbyl. The variable $R^2$ at each occurrence is independently chosen from —CN, $CONR^A{}_2$, and —$COOR^A$, wherein $R^A$ at each occurrence is independently chosen from —H and substituted or unsubstituted $(C_1$-$C_{30})$hydrocarbyl. The variable $R^3$ at each occurrence is independently chosen from substituted or unsubstituted $(C_1$-$C_{30})$hydrocarbyl, a substituted or unsubstituted $(C_1$-$C_{10})$heterocyclyl, and a $(C_1$-$C_{30})$ hydrocarbyl substituted by a substituted or unsubstituted $(C_1$-$C_{10})$heterocyclyl and interrupted by 0, 1, 2, or 3 groups independently chosen from —O—, —S—, and substituted or unsubstituted —NH—. The variable M is a Michael-addition donor. The system also includes a subterranean formation including the composition therein.

In various embodiments, the present invention provides an acidizing composition for treatment of a subterranean formation. The acidizing composition includes an acid and a compound having a structure chosen from:

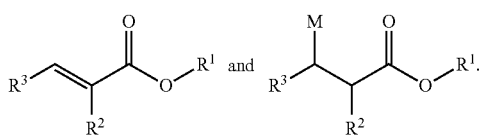

The variable $R^1$ at each occurrence is independently chosen from —H and substituted or unsubstituted $(C_1$-$C_{30})$hydrocarbyl. The variable $R^2$ at each occurrence is independently chosen from —CN, $CONR^A{}_2$, and —$COOR^A$, wherein $R^A$ at each occurrence is independently chosen from —H and substituted or unsubstituted $(C_1$-$C_{30})$hydrocarbyl. The variable $R^3$ at each occurrence is independently chosen from substituted or unsubstituted $(C_1$-$C_{30})$hydrocarbyl, a substituted or unsubstituted $(C_1$-$C_{10})$heterocyclyl, and a $(C_1$-$C_{30})$ hydrocarbyl substituted by a substituted or unsubstituted $(C_1$-$C_{10})$heterocyclyl and interrupted by 0, 1, 2, or 3 groups independently chosen from —O—, —S—, and substituted or unsubstituted —NH—. The variable M is a Michael-addition donor.

In various embodiments, the present invention provides a composition for treatment of a subterranean formation. The acidizing composition includes an acid and a compound having the structure:

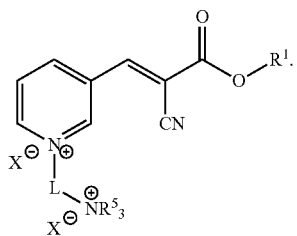

The variable $R^1$ is $(C_1$-$C_5)$alkyl. The variable L is $(C_1$-$C_{15})$ alkylene. The variable $R^5$ is $(C_1$-$C_5)$alkyl. The variable $X^-$ at each occurrence is independently selected from halide.

In various embodiments, the present invention provides a method of preparing an acidizing composition for treatment of a subterranean formation. The method includes forming an acidizing composition including an acid and a compound having a structure chosen from:

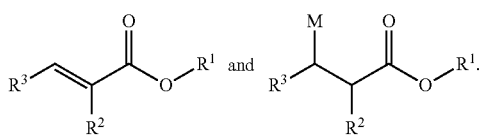

The variable $R^1$ at each occurrence is independently chosen from —H and substituted or unsubstituted $(C_1$-$C_{30})$hydrocarbyl. The variable $R^2$ at each occurrence is independently chosen from —CN, $CONR^A{}_2$, and —$COOR^A$, wherein $R^A$ at each occurrence is independently chosen from —H and substituted or unsubstituted $(C_1$-$C_{30})$hydrocarbyl. The variable $R^3$ at each occurrence is independently chosen from substituted or unsubstituted $(C_1$-$C_{30})$hydrocarbyl, a substituted or unsubstituted $(C_1$-$C_{10})$heterocyclyl, and a $(C_1$-$C_{30})$ hydrocarbyl substituted by a substituted or unsubstituted $(C_1$-$C_{10})$heterocyclyl and interrupted by 0, 1, 2, or 3 groups independently chosen from —O—, —S—, and substituted or unsubstituted —NH—. The variable M is a Michael-addition donor.

Various embodiments of the composition and method of using the same have certain advantages over other acidizing composition and methods for acidizing, at least some of which are unexpected. In various embodiments, the composition can perform multiple functions using fewer components, such as by using a single component to perform at least two of inhibiting corrosion, absorbing sulfide gas (e.g., sulfide scavenging), and forming a chelator or chelating ions, thereby eliminating the need for separate chelator, corrosion inhibitor, and sulfide scavenger components. In various embodiments, the composition and method of using the same can be less expensive to perform, due to, for example, fewer components in the composition, and low cost of the components of the composition (e.g., facile and affordable synthesis), as compared to other acidizing compositions.

In some embodiments, the composition can form a chelator in situ downhole. In various embodiments, use of the composition and the method of using the same can result in less sludging, such as less production of asphaltene precipitates. In various embodiments, the composition and method of using the same can cause less damage, such as to metal equipment and to cement. In various embodiments, use of the composition can be less expensive overall due to a reduction in damage, including a reduction in corrosion and sulfide stress cracking as well as a reduction in sludges such as asphaltene precipitates, as compared to other compositions and methods.

In various embodiments, the acidizing composition and method of using the same can be used for multiple purposes, including at least one of corrosion inhibition, carbonate acidizing, iron sulfide scale removal, filter cake removal, and sulfide scavenging. In various embodiments, the filter cake removal composition described herein can be used for filter cake removal for efficient filter cake removal in conditions such as a sour gas environment. In various embodiments, the composition and method of using the same can be used with less efforts and expenditure related to sour gas mitigation operations. In various embodiments, the composition can be used at high temperature conditions with greater effectiveness than other acidizing compositions or filter cake removal compositions and methods of using the same. In various embodiments, the composition and method of using the same can be used for both mud filter cake removal, carbonate scale removal, and iron scale removal. In various embodiments, the composition and method of using the same can also be used for clay control, such as in a sour gas environment. In various embodiments, the composition and method of using the same can have higher yield efficiency. In some embodiments, the composition also causes friction reduction. In various embodiments, the composition can be safely and effectively used with coiled tubing. In various embodiments, the composition and method of using the same can be more health-friendly and environmentally-friendly than other compositions and methods of using the same, allowing use in various regions having strict rules regarding health and environmental safety.

Method of Treating a Subterranean Formation.

In some embodiments, the present invention provides a method of treating a subterranean formation. The method includes placing an acidizing composition in a subterranean formation. The placing of the acidizing composition in the subterranean formation can include contacting the acidizing composition and any suitable part of the subterranean formation, or contacting the acidizing composition and a subterranean material, such as any suitable subterranean material, such as material comprising at least one of a carbonate mineral, gypsum, anhydrite, calcite, dolomite, magnesite, and apatite. Carbonate minerals can include any mineral that includes a carbonate ion. Carbonate minerals can include anhydrous carbonates such as calcites (e.g., calcite, gaspeite, magnesite, otavite, rhodochrosite, siderite, smithsonite, or spherocobaltite) argonites (e.g., aragonite, cerussite, strontianite, witherite, rutherfordine, or natrite), or dolomites (ankerite, dolomite, huntite, minrecordite, or harytocite). Carbonate minerals can include carbonates with hydroxyl or halogen (e.g., azurite, hydrocerussite, malachite, rosasite, phosgenite, hydrozincite, or aurichalcite). Carbonate minerals can include hydrated carbonates (e.g., hydromagnesite, ikaite, lansfordite, monohydrocalcite, natron, or zellerite). The subterranean formation can be any suitable subterranean formation. In some examples, the placing of the acidizing composition in the subterranean formation includes contacting the composition with or placing the composition in at least one of a fracture, at least a part of an area surrounding a fracture, a flow pathway, an area surrounding a flow pathway, and an area desired to be fractured. The placing of the acidizing composition in the subterranean formation can be any suitable placing and can include any suitable contacting between the subterranean formation and the acidizing composition. The placing of the acidizing composition in the subterranean formation can include at least partially depositing the acidizing composition in a fracture, flow pathway, or area surrounding the same. In some embodiments, the method can be a method of stimulation, fracturing, spotting, clean-up, completion, remedial treatment, applying a pill, acidizing, cementing, packing, spotting, or a combination thereof.

In some embodiments, the method includes obtaining or providing the acidizing composition. The obtaining or providing of the acidizing composition can occur at any suitable time and at any suitable location. The obtaining or providing of the acidizing composition can occur above the surface. The obtaining or providing of the acidizing composition can occur in the subterranean formation (e.g., downhole).

The method can include hydraulic fracturing, such as a method of hydraulic fracturing to generate a fracture or flow pathway. The placing of the acidizing composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the acidizing composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the acidizing composition is placed or contacted, or the acidizing composition is placed or contacted to an area surrounding the generated fracture or flow pathway.

Acidizing Composition.

In various embodiments the composition described herein is an acidizing composition that includes an acid and the compound described herein having a structure chosen from:

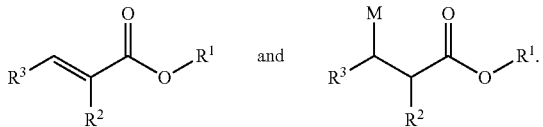

The acid can be any one or any combination of suitable acids. The acid can be at least one of hydrochloric acid, sulfuric acid, fluoric acid, nitric acid, phosphoric acid, boric acid, hydrobromic acid, perchloric acid, acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof (e.g., a ($C_1$-$C_{20}$) hydrocarbyl ester thereof), and mixtures thereof. In some embodiments, the acid can be at least one of hydrochloric acid, fluoric acid, acetic acid, and formic acid. Any suitable proportion of the composition can be the one or more acids, such as about 0.01 wt % to about 50 wt % of the acidizing composition, about 1 wt % to about 5 wt %, about 2 wt % to about 4 wt %, about 0.01 wt % or less, or about 0.05 wt %, 0.1, 0.5, 1, 1.5, 2, 2.5, 3, 3.5, 4, 4.5, 5, 6, 7, 8, 9, 10, 12, 14, 16, 18, 20, 25, 30, 35, 40, 45, or about 50 wt % or more.

Filter Cake Removal Composition.

In various embodiment, the composition is a filter cake removal composition that includes the compound described herein having a structure chosen from:

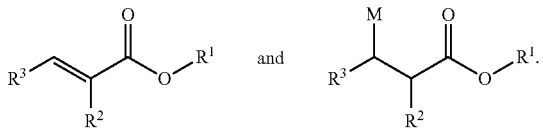

In various embodiments, the filter cake removal composition is the same as the acidizing composition described herein, with the exception that the acid is an optional component of the filter cake removal composition. The method of use the filter cake removal composition can include any feature described herein for the method of use of the acidizing composition, and also includes dissolving or removing a filter cake in the subterranean formation with the composition or a reaction product thereof (e.g., a hydrolysis or Michael-addition reaction product thereof). The compound can scavenge $H_2S$ or other Michael-acceptor donors. The compound can hydrolyze, such as from at least one of pH conditions downhole and temperatures downhole, which can lower the pH of system. In various embodiments, the hydrolysis of the compound can occur slowly or over a delayed period, providing a gentle decrease in pH. In various embodiments, the filter cake removal composition can include basic materials to increase the pH and further delay or prolong the hydrolysis of the compound. The hydrolyzed compound can dissolve or break the filter cake, such as via the lower pH. In various embodiments, the hydrolyzed divalent carboxylic acid can chelate with bridging particles (e.g., calcium) to ensure efficient filter cake removal, such as in a sour gas environment. The filter cake removal composition can include the compound alone or can include any optional component described herein, such as a hydrolysable esters, an inorganic oxidizer, or an enzyme oxidizer.
Composition.

The acidizing composition or filter cake removal composition includes a compound having a structure chosen from:

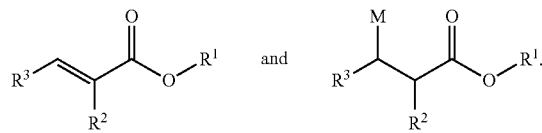

The variable $R^1$ at each occurrence can be independently chosen from —H and substituted or unsubstituted ($C_1$-$C_{30}$) hydrocarbyl. The variable $R^2$ at each occurrence can be independently chosen from —CN, CONR$^4_2$, and —COOR$^4$, wherein $R^4$ at each occurrence can be independently chosen from —H and substituted or unsubstituted ($C_1$-$C_{30}$)hydrocarbyl. The variable $R^3$ at each occurrence can be independently chosen from substituted or unsubstituted ($C_1$-$C_{30}$)hydrocarbyl, a substituted or unsubstituted ($C_1$-$C_{10}$)heterocyclyl, and a ($C_1$-$C_{30}$)hydrocarbyl substituted by a substituted or unsubstituted ($C_1$-$C_{10}$)heterocyclyl and interrupted by 0, 1, 2, or 3 groups independently chosen from —O—, —S—, and substituted or unsubstituted —NH—. The variable M can be a Michael-addition donor. The composition can include compounds having one of the structures in this paragraph, or some compounds having one of the structures and some compounds having the other structure in this paragraph in any suitable proportion. Any suitable proportion of the composition can be the one or more compounds, such as about 0.001 wt % to about 30 wt % of the composition, about 0.01 wt % to about 10 wt % of the composition, about 0.001 wt % or less, or about 0.01 wt %, 0.05, 0.1, 0.5, 1, 1.5, 2, 2.5, 3, 3.5, 4, 4.5, 5, 6, 7, 8, 9, 10, 12, 14, 16, 18, 20, 25, or about 30 wt % or more is the compound. In some embodiments, the obtaining or providing of the composition can include mixing the one or more compounds and the acid.

In various embodiments, the compound can at least one of 1) provide formation of an in situ chelator, 2) chelate ions, 3) provide corrosion resistance to metals and other materials, and 4) scavenge sulfide. In various embodiments, the compound provides an acidizing composition that is useful for carbonate acidizing in sour gas environment, and that protects metal equipment such as tubulars during an acidizing procedure.

In some embodiments, the compound has the structure:

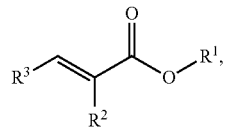

wherein at least one of 1) $R^1$ is not —H and 2) $R^2$ is —CN (e.g., not —COOH). The method can include hydrolyzing the compound such that at least one of $R^1$ is —H and $R^2$ is —COOH. The hydrolyzing can occur at least partially above-surface, at least partially in the subterranean formation, or a combination thereof. For example, the compound can be mixed with acid and pumped downhole. As per the nature of this organic compound, in presence of acid (e.g, HCl, such as 3-4 wt % HCl) the ester (—O—$R^1$) and —CN (nitrile group) can undergo hydrolysis to generate a dicarboxylic group which can act as a chelating site for chelation of various ions, such as Ca from Calcite and Ca or Mg from Dolomite. Additionally, the Michael acceptor in the molecule (e.g., the beta-position of the alpha,beta-unsaturated ester or acid) can scavenge $H_2S$ present downhole and in the subterranean formation. In various embodiments, $R^3$ can be a corrosion inhibiting-portion of the molecule, such as a pyridinium salts, inhibiting corrosion to metal equipment such as tubulars.

In some embodiments, the method can include contacting a compound having the structure:

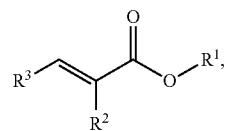

with a Michael-addition donor (e.g., M-H) to form a reaction product thereof, forming a compound having the structure:

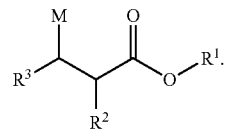

The Michael-addition can occur at least partially above-surface, at least partially in the subterranean formation, or a combination thereof.

The variable $R^1$ at each occurrence can be independently chosen from —H and substituted or unsubstituted ($C_1$-$C_{30}$) hydrocarbyl. The variable $R^1$ at each occurrence can be independently chosen from —H and substituted or unsubstituted ($C_1$-$C_{30}$)alkyl. The variable $R^1$ at each occurrence can be independently chosen from —H and ($C_1$-$C_{15}$)alkyl. The variable $R^1$ at each occurrence can be independently chosen from —H and ($C_1$-$C_5$)alkyl. The variable $R^1$ at each occurrence can be independently chosen from methyl, ethyl, isopropyl, t-butyl, and n-butyl.

The variable $R^2$ at each occurrence can be independently chosen from —CN, CONR$^4_2$, and —COOR$^4$. The variable $R^2$ at each occurrence can be independently chosen from —CN and —COOR$^4$. The variable $R^2$ can be —CN.

The variable $R^4$ at each occurrence can be independently chosen from —H and substituted or unsubstituted ($C_1$-$C_{30}$) hydrocarbyl. The variable $R^4$ at each occurrence can be independently chosen from —H and substituted or unsubstituted ($C_1$-$C_{30}$)alkyl. The variable $R^4$ at each occurrence can be independently chosen from —H and ($C_1$-$C_{15}$)alkyl. The variable $R^4$ at each occurrence can be independently chosen from —H and ($C_1$-$C_5$)alkyl. The variable $R^4$ can be —H.

The variable $R^3$ at each occurrence can be independently chosen from substituted or unsubstituted ($C_1$-$C_{30}$)hydrocarbyl, a substituted or unsubstituted ($C_1$-$C_{10}$)heterocyclyl, and a ($C_1$-$C_{30}$)hydrocarbyl substituted by a substituted or unsubstituted ($C_1$-$C_{10}$)heterocyclyl and interrupted by 0, 1, 2, or 3 groups independently chosen from —O—, —S—, and substituted or unsubstituted —NH—.

The variable $R^3$ can be a corrosion inhibiting-portion of the compound. The variable $R^3$ can be independently chosen from substituted or unsubstituted $(C_1-C_{30})$hydrocarbyl and a substituted or unsubstituted $(C_1-C_{10})$heterocyclyl. The variable $R^3$ at each occurrence can be independently $(C_1-C_{10})$heterocyclyl-L-$R^4$, wherein the $(C_1-C_{10})$heterocyclyl is further substituted or further unsubstituted. The variable $R^3$ at each occurrence can be independently

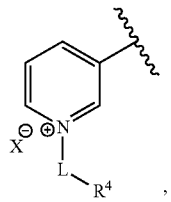

wherein $X^-$ is a counterion. In various embodiments, the amine salt of $R^3$ can provide clay control.

The variable L at each occurrence can be independently chosen from a bond and a $(C_1-C_{30})$hydrocarbylene interrupted by 0, 1, 2, or 3 groups independently chosen from —O—, —S—, and substituted or unsubstituted —NH—. The variable L at each occurrence can be independently chosen from a bond and a $(C_1-C_{30})$alkylene. The variable L at each occurrence can be independently chosen from methylene, ethylene, propylene, butylene, pentylene, hexylene, heptylene, and octylene.

The variable $R^4$ at each occurrence can be independently chosen from —H and —$N^+R^5_3X^-$, wherein at each occurrence $R^5$ can be independently substituted or unsubstituted $(C_1-C_{10})$alkyl and $X^-$ is a counterion. The variable $R^4$ at each occurrence can be independently chosen from —H and —$N^+R^5_3X^-$. In various embodiments, the amine salt of $R^4$ can provide clay control. The variable $R^5$ at each occurrence can be independently substituted or unsubstituted $(C_1-C_5)$alkyl and $X^-$ can be a halide.

In various embodiments, $X^-$ at each occurrence is independently any negatively charged counterion, such as any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The variable M can be a Michael-addition donor. As used herein, a Michael-addition donor is a nucleophile that participates in a nucleophilic addition to the beta-position of an alpha,beta-unsaturated carbonyl. The variable M represents the Micheal-addition donor after it has added to the alpha, beta-unsaturated carbonyl, where M-H can represent the Michael-addition donor prior to addition to the alpha,beta-unsaturated carbonyl. The variable M at each occurrence can be independently selected from —SH and —$SR^6$, wherein $R^6$ is a substituted or unsubstituted $(C_1-C_{30})$hydrocarbyl interrupted by 0, 1, 2, or 3 groups independently chosen from —O—, —S—, and substituted or unsubstituted —NH—. The variable M can be —SH.

The compound can have a structure chosen from:

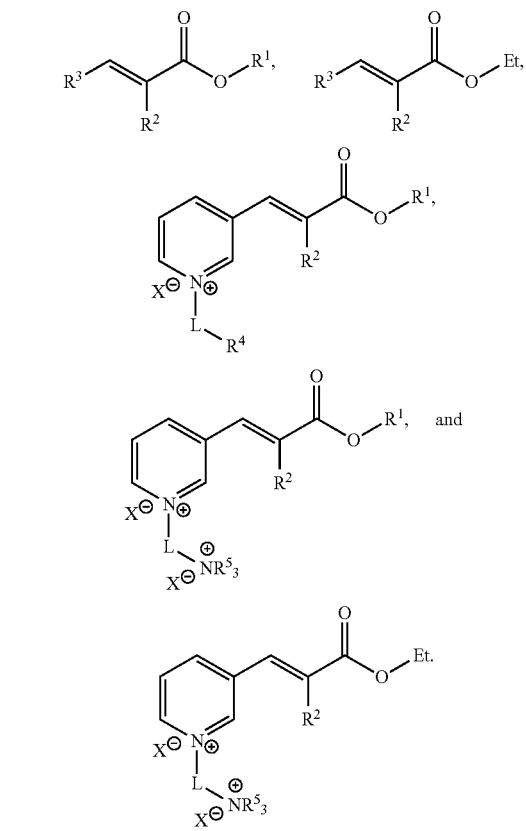

The compound can have a structure chosen from:

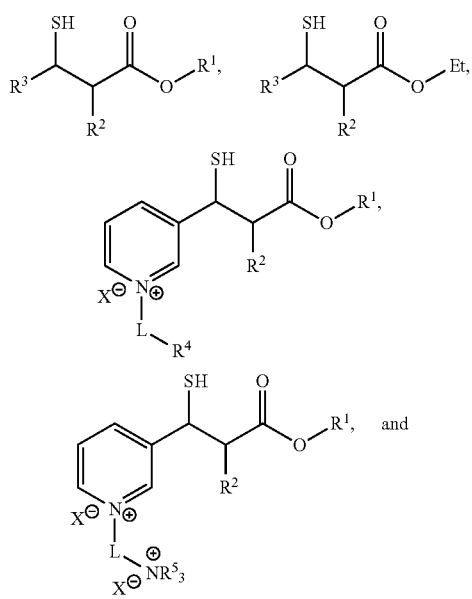

-continued

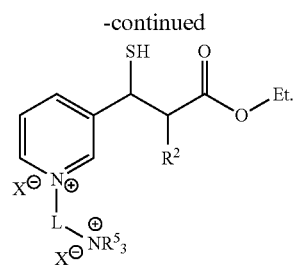

The compound can have a structure chosen from:

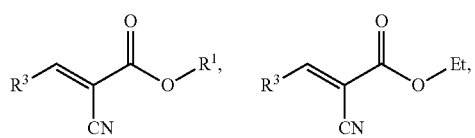

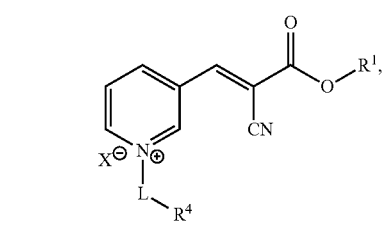

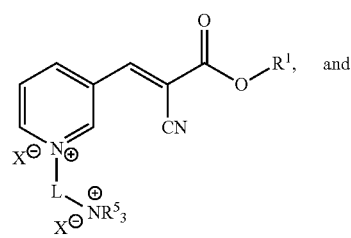

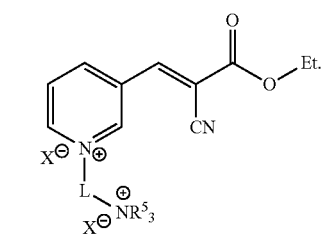

The compound can have a structure chosen from:

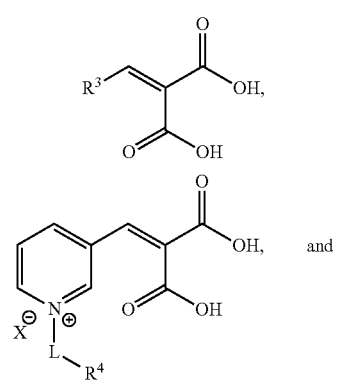

-continued

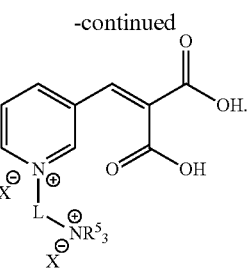

The compound can have a structure chosen from:

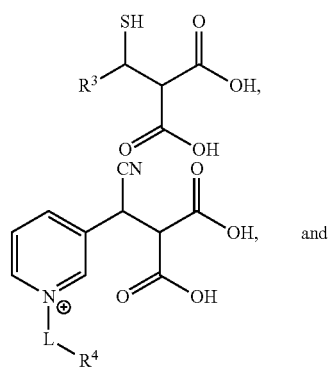

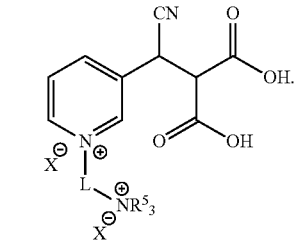

Other Components.

The composition (e.g., acidizing composition or filter cake removal composition), or a mixture including the composition, can include any suitable additional component in any suitable proportion, such that the composition, the acid, or mixture including the same, can be used as described herein.

The composition, or a mixture including the composition, can include one or more chelating agents. The chelating agent can be any suitable chelating agent, such as at least one of polyaspartic acid, a polyaminocarboxylic acid, iminodisuccinic acid (IDS), hydroxyethylene iminodisuccinic acid (HIDS), N-(2-hydroxyethyl)ethylenediaminetriacetic acid (HEDTA), glutamic acid N,N-diacetic acid (GLDA), methyl-glycine-N,N-diacetic acid (MGDA), hydroxyiminodisuccinic acid (HIDS), β-alanine diacetic acid, S,S-ethylenediaminedisuccinic acid, diethylenetriaminepentaacetic acid (DTPA), nitrilotriacetic acid (NTA), ethyleneglycoltetraacetic acid (EGTA), 1,2-bis(aminophenoxy) ethane-N,N,N',N'-tetraacetic acid (BAPTA), cyclohexanediaminetetraacetic acid (CDTA), triethylenetetraaminehexaacetic acid (TTHA), N-hydroxyethylaminodiacetic acid, 2-hydroxyethyliminodiacetic acid, malic acid, tartaric acid, and citric acid. The one or more chelating agents can be present in the composition or a mixture including the same in any suitable amount such that ions can be chelated, such as about 0.01 wt % to about 10 wt % of the composition or a mixture including the same, about 0.1 wt % to about 5 wt %, or about 0.01 wt % or less, 0.05, 0.1, 0.5, 1, 2, 3, 4, 5, 6, 7, 8, 9, or about 10 wt % or more of the composition or a mixture including the same.

In various embodiments, the composition, or a mixture including the composition, can include one or more sulfide scavengers. The sulfide scavenger can be any suitable sulfide scavenger, such as at least one of a zinc compound (e.g., zinc oxide or zinc carbonate), caustic soda, an oxidant (e.g., chlorine dioxide), SulfaTreat™ Scavenger, Sulfa-Check™ 2420, SulfuSorb™, Sulfa-Scrub™ (which contains triazine), Magnatreat™ M-401, and Iron Sponge™, to name a few. The sulfide scavenger can be present in the composition or a mixture including the same in any suitable amount such that sulfide concentration can be reduced, such as about 0.01 wt % to about 10 wt % of the composition or a mixture including the same, about 0.1 wt % to about 5 wt %, or about 0.01 wt % or less, 0.05, 0.1, 0.5, 1, 2, 3, 4, 5, 6, 7, 8, 9, or about 10 wt % or more of the composition or a mixture including the same.

In various embodiments, the composition, or a mixture including the composition, can include one or more corrosion inhibitors. The corrosion inhibitor can be any suitable corrosion inhibitor. For example, the corrosion inhibitor can be at least one of a cinnamaldehyde compound and an acetylenic compound. The one or more corrosion inhibitors can be present in the composition or a mixture including the same in any suitable amount, such that corrosion can be reduced, such as about 0.01 wt % to about 10 wt % of the composition or a mixture including the same, about 0.1 wt % to about 5 wt %, or about 0.01 wt % or less, 0.05, 0.1, 0.5, 1, 2, 3, 4, 5, 6, 7, 8, 9, or about 10 wt % or more of the composition or a mixture including the same.

In some embodiments, the corrosion inhibitor can be a cinnamaldehyde compound, such as cinnamaldehyde or a cinnamaldehyde derivative. Cinnamaldehyde derivatives can include any compound that may act as a source of cinnamaldehyde. Examples of cinnamaldehyde derivatives can include dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-trocinnamaldehyde, o-nitrocinnamaldehyde, o-allyloxycinnamaldehyde, 4-(3-propenal)cinnamaldehyde, p-sodium sulfocinnamaldehyde, p-ethylammoniumcinnamaldehyde sulfate, p-trimethylammoniumcinnamaldehyde, o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, p-methyl-α-pentylcinnamaldehyde, cinnamaloxime, cinnamonitrile, 5-phenyl-2,4-pentadienal, 7-phenyl-2,4,6-heptatrienal, and combinations thereof.

In certain embodiments, the corrosion inhibitor can include acetylenic compound, such as methyl butynol, methyl pentynol, hexynol, ethyl octynol, propargyl alcohol, benzylbutynol, ethynylcyclohexanol, ethoxy acetylenics, propoxy acetylenics, hexynol, propargyl alcohol, methyl butynol, ethyl octynol, propargyl alcohol ethoxylate (e.g., Golpanol PME), propargyl alcohol propoxylate (e.g., Golpanol PAP), and combinations thereof.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu_{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$ and an $Al^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition or a mixture including the same can include any suitable downhole fluid. The composition can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUA-GEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A pill is a relatively small quantity (e.g., less than about 500 bbl, or less than about 200 bbl) of fluid used to accomplish a specific task that the regular fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include an embodiment of the composition described herein. The system can also include a subterranean formation including the composition therein. In some embodiments, the composition in the system can also include a downhole fluid, or the system can include a mixture of the composition and a downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein such as for an acidizing operation or a acid fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing the composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of one or more components of the composition originally placed in the subterranean formation. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include an acid and a compound having a formula chosen from

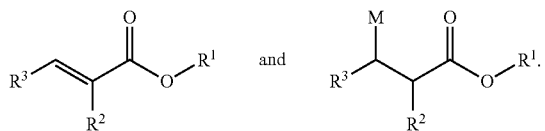

The variable $R^1$ at each occurrence can be independently chosen from —H and substituted or unsubstituted $(C_1-C_{30})$hydrocarbyl. The variable $R^2$ at each occurrence can be independently chosen from —CN, $CONR^A_2$, and —$COOR^A$, wherein $R^A$ at each occurrence can be independently chosen from —H and substituted or unsubstituted $(C_1-C_{30})$hydrocarbyl. The variable $R^3$ at each occurrence can be independently chosen from substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—. The variable M can be a Michael-addition donor.

In some embodiments, the composition further includes a downhole fluid. The downhole fluid can be any suitable downhole fluid. In some embodiments, the downhole fluid is a composition for fracturing of a subterranean formation or subterranean material, or a fracturing fluid.

In some embodiments, the composition can include a compound having the structure:

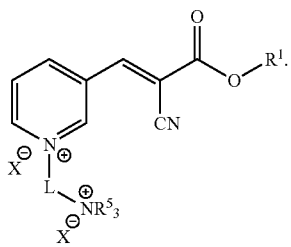

The variable $R^1$ can be $(C_1-C_5)$alkyl. The variable L can be $(C_1-C_{15})$alkylene. The variable $R^5$ can be $(C_1-C_5)$alkyl. The variable $X^-$ at each occurrence can be halide.

Method for Preparing a Composition for Treatment of a Subterranean Formation.

In various embodiments, the present invention provides a method for preparing a composition for treatment of a subterranean formation. The method can be any suitable method that produces a composition described herein.

In some embodiments, the method can include reacting a pyridin-3-al with an alkyl ester of $NCCH_2CO_2H$ (e.g., $NCCH_2CO_2Et$) to form the pyridin-3-yl alpha,beta-unsaturated alpha-cyano alkyl ester, followed by treatment with $MeSO_3Et$ to produce the $N^+$-ethyl substituted $CH_3SO_3^-$ salt.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation an acidizing composition comprising
an acid; and
a compound having a structure chosen from:

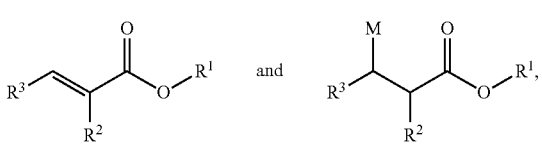

wherein
$R^1$ at each occurrence is independently chosen from —H and substituted or unsubstituted $(C_1-C_{30})$hydrocarbyl,
$R^2$ at each occurrence is independently chosen from —CN, $CONR^A_2$, and —$COOR^A$, wherein $R^A$ at each occurrence is independently chosen from —H and substituted or unsubstituted $(C_1-C_{30})$hydrocarbyl, R³ at each occurrence is independently chosen from substituted or unsubstituted ($C_1$-$C_{30}$)hydrocarbyl, a substituted or unsubstituted ($C_1$-$C_{10}$)heterocyclyl, and a ($C_1$-$C_{30}$)hydrocarbyl substituted by a substituted or unsubstituted ($C_1$-$C_{10}$)heterocyclyl and interrupted by 0, 1, 2, or 3 groups independently chosen from —O—, —S—, and substituted or unsubstituted —NH—, and M is a Michael-addition donor.

Embodiment 2 provides the method of Embodiment 1, wherein the method further comprises obtaining or providing the acidizing composition, wherein the obtaining or providing of the acidizing composition occurs above-surface.

Embodiment 3 provides the method of any one of Embodiments 1-2, wherein the method further comprises obtaining or providing the acidizing composition, wherein the obtaining or providing of the acidizing composition occurs in the subterranean formation.

Embodiment 4 provides the method of any one of Embodiments 1-3, wherein at least one of $R^1$ is not —H and $R^2$ is not —COOH, further comprising hydrolyzing the compound such that at least one of $R^1$ is —H and $R^2$ is —COOH.

Embodiment 5 provides the method of any one of Embodiments 1-4, wherein the compound has the structure:

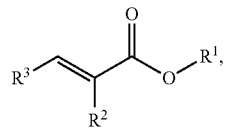

further comprising contacting the compound with a Michael-addition donor to form a compound having the structure:

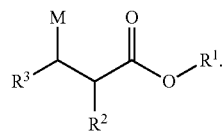

Embodiment 6 provides the method of any one of Embodiments 1-5, further comprising mixing the compound with the acid to form the acidizing composition.

Embodiment 7 provides the method of any one of Embodiments 1-6, wherein about 0.01 wt % to about 50 wt % of the acidizing composition is the acid.

Embodiment 8 provides the method of any one of Embodiments 1-7, wherein about 1 wt % to about 5 wt % of the acidizing composition is the acid.

Embodiment 9 provides the method of any one of Embodiments 1-8, wherein the acid is at least one of hydrochloric acid, sulfuric acid, fluoric acid, nitric acid, phosphoric acid, boric acid, hydrobromic acid, perchloric acid, acetic acid, formic acid, lactic acid, citric acid, oxalic acid, uric acid, glutaric acid, glutamic acid, glycolic acid, malonic acid, tartaric acid, adipic acid, sulfamic acid, chloroacetic acid, phthalic acid, a monoaminopolycarboxylic acid, a polyaminopolycarboxylic acid, a salt thereof, an ester thereof (e.g., a ($C_1$-$C_{20}$)hydrocarbyl ester thereof), and mixtures thereof.

Embodiment 10 provides the method of any one of Embodiments 1-9, wherein the acid is at least one of hydrochloric acid, fluoric acid, acetic acid, and formic acid.

Embodiment 11 provides the method of any one of Embodiments 1-10, wherein the compound has the structure:

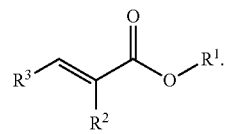

Embodiment 12 provides the method of Embodiment 11, wherein about 0.001 wt % to about 30 wt % of the composition is the compound.

Embodiment 13 provides the method of any one of Embodiments 11-12, wherein about 0.01 wt % to about 10 wt % of the composition is the compound.

Embodiment 14 provides the method of any one of Embodiments 1-13, wherein the compound has the structure:

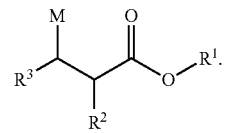

Embodiment 15 provides the method of Embodiment 14, wherein about 0.001 wt % to about 30 wt % of the composition is the compound.

Embodiment 16 provides the method of any one of Embodiments 14-15, wherein about 0.01 wt % to about 10 wt % of the composition is the compound.

Embodiment 17 provides the method of any one of Embodiments 1-16, wherein $R^1$ at each occurrence is independently chosen from —H and substituted or unsubstituted ($C_1$-$C_{30}$)alkyl.

Embodiment 18 provides the method of any one of Embodiments 1-17, wherein $R^1$ at each occurrence is independently chosen from —H and ($C_1$-$C_{15}$)alkyl.

Embodiment 19 provides the method of any one of Embodiments 1-18, wherein $R^1$ at each occurrence is independently chosen from —H and ($C_1$-$C_5$)alkyl.

Embodiment 20 provides the method of any one of Embodiments 1-19, wherein $R^1$ at each occurrence is independently chosen from methyl, ethyl, isopropyl, t-butyl, and n-butyl.

Embodiment 21 provides the method of any one of Embodiments 1-20, wherein $R^2$ at each occurrence is independently chosen from —CN and —COOR^A.

Embodiment 22 provides the method of any one of Embodiments 1-21, wherein $R^2$ is —CN.

Embodiment 23 provides the method of any one of Embodiments 1-22, wherein $R^A$ at each occurrence is independently chosen from —H and substituted or unsubstituted ($C_1$-$C_{30}$)alkyl.

Embodiment 24 provides the method of any one of Embodiments 1-23, wherein $R^A$ at each occurrence is independently chosen from —H and ($C_1$-$C_{15}$)alkyl.

Embodiment 25 provides the method of any one of Embodiments 1-24, wherein $R^A$ at each occurrence is independently chosen from —H and ($C_1$-$C_5$)alkyl.

Embodiment 26 provides the method of any one of Embodiments 1-25, wherein $R^A$ is —H.

Embodiment 27 provides the method of any one of Embodiments 1-26, wherein $R^3$ is a corrosion inhibiting-portion of the compound.

Embodiment 28 provides the method of any one of Embodiments 1-27, wherein $R^3$ at each occurrence is independently chosen from substituted or unsubstituted $(C_1-C_{30})$ hydrocarbyl and a substituted or unsubstituted $(C_1-C_{10})$ heterocyclyl.

Embodiment 29 provides the method of any one of Embodiments 1-28, wherein at each occurrence, $R^3$ is independently $(C_1-C_{10})$heterocyclyl-L-$R^4$, wherein the $(C_1-C_{10})$heterocyclyl is further substituted or further unsubstituted, at each occurrence, L is independently chosen from a bond and a $(C_1-C_{30})$hydrocarbylene interrupted by 0, 1, 2, or 3 groups independently chosen from —O—, —S—, and substituted or unsubstituted —NH—, and at each occurrence, $R^4$ is independently chosen from —H and —N$^+$R$^5_3$X$^-$, wherein at each occurrence $R^5$ is independently substituted or unsubstituted $(C_1-C_{10})$alkyl and X$^-$ is a counterion.

Embodiment 30 provides the method of Embodiment 29, wherein at each occurrence, $R^3$ is independently

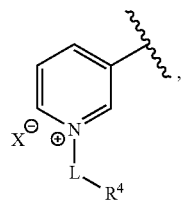

wherein X$^-$ is a counterion.

Embodiment 31 provides the method of any one of Embodiments 29-30, wherein at each occurrence, L is independently chosen from a bond and a $(C_1-C_{30})$alkylene.

Embodiment 32 provides the method of any one of Embodiments 29-31, wherein at each occurrence, L is independently chosen from methylene, ethylene, propylene, butylene, pentylene, hexylene, heptylene, and octylene.

Embodiment 33 provides the method of any one of Embodiments 29-32, wherein at each occurrence, $R^4$ is independently chosen from —H and —N$^+$R$^5_3$X$^-$, wherein at each occurrence $R^5$ is independently substituted or unsubstituted $(C_1-C_5)$alkyl and X$^-$ is a halide.

Embodiment 34 provides the method of any one of Embodiments 1-33, wherein at each occurrence M is independently selected from —SH and —SR$^6$, wherein R$^6$ is a substituted or unsubstituted $(C_1-C_{30})$hydrocarbyl interrupted by 0, 1, 2, or 3 groups independently chosen from —O—, —S—, and substituted or unsubstituted —NH—.

Embodiment 35 provides the method of any one of Embodiments 1-34, wherein M is —SH.

Embodiment 36 provides the method of any one of Embodiments 1-35, wherein the compound has a structure chosen from:

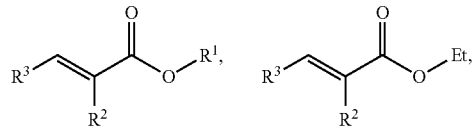

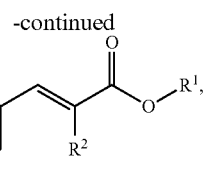

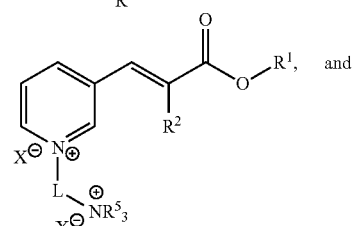

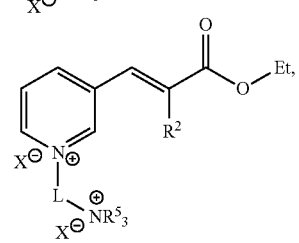

wherein L is independently chosen from a bond and a $(C_1-C_{15})$alkylene, $R^4$ is independently chosen from —H and —N$^+$R$^5_3$X$^-$, $R^5$ is $(C_1-C_5)$alkyl, and X$^-$ is a counterion.

Embodiment 37 provides the method of any one of Embodiments 1-36, wherein the compound has a structure chosen from:

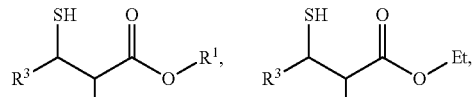

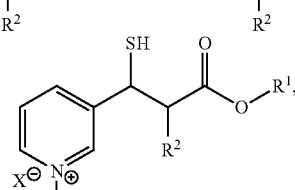

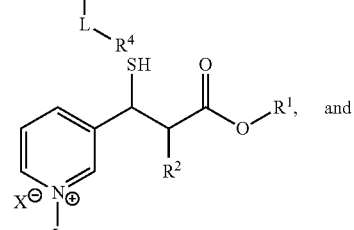

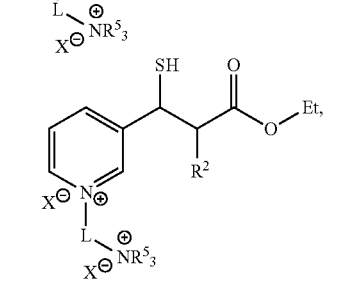

wherein L is independently chosen from a bond and a $(C_1-C_{15})$alkylene, $R^4$ is independently chosen from —H and —$N^+R^5{}_3X^-$, $R^5$ is $(C_1-C_5)$alkyl, and $X^-$ is a counterion.

Embodiment 38 provides the method of any one of Embodiments 1-37, wherein the compound has a structure chosen from:

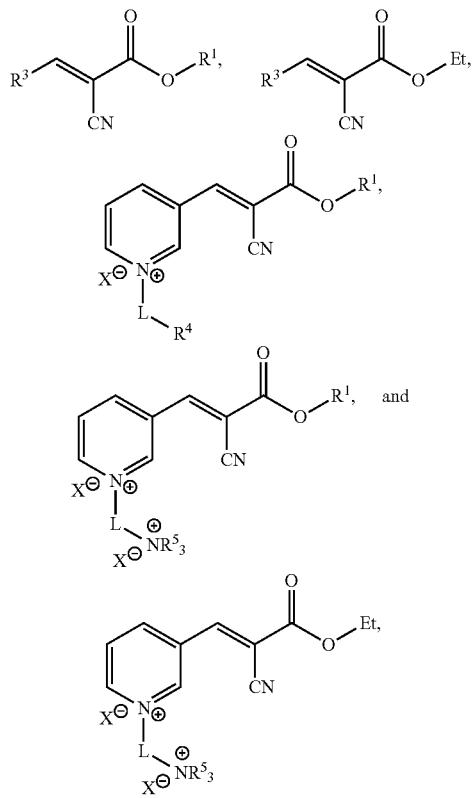

wherein L is independently chosen from a bond and a $(C_1-C_{15})$alkylene, $R^4$ is independently chosen from —H and —$N^+R^5{}_3X^-$, $R^5$ is $(C_1-C_5)$alkyl, and $X^-$ is a counterion.

Embodiment 39 provides the method of any one of Embodiments 1-38, wherein the compound has a structure chosen from:

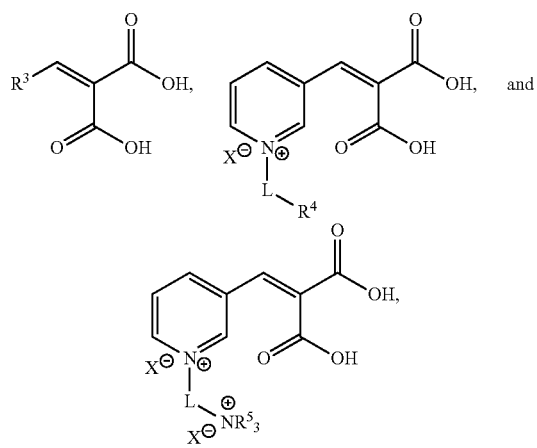

wherein L is independently chosen from a bond and a $(C_1-C_{15})$alkylene, $R^4$ is independently chosen from —H and —$N^+R^5{}_3X^-$, $R^5$ is $(C_1-C_5)$alkyl, and $X^-$ is a counterion.

Embodiment 40 provides the method of any one of Embodiments 1-39, wherein the compound has a structure chosen from:

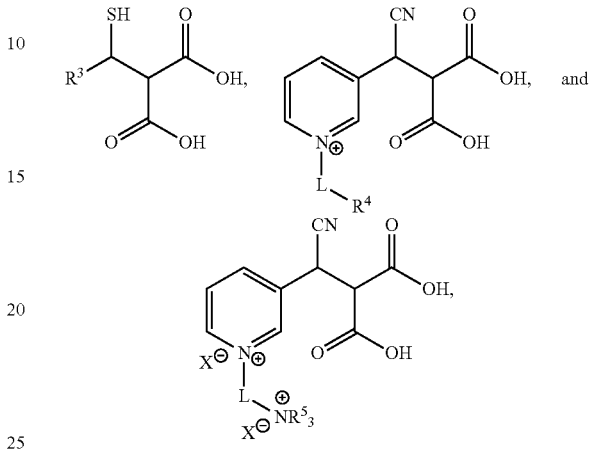

wherein L is independently chosen from a bond and a $(C_1-C_{15})$alkylene, $R^4$ is independently chosen from —H and —$N^+R^5{}_3X^-$, $R^5$ is $(C_1-C_5)$alkyl, and $X^-$ is a counterion.

Embodiment 41 provides the method of any one of Embodiments 1-40, wherein the composition further comprises a chelating agent.

Embodiment 42 provides the method of any one of Embodiments 1-41, wherein the composition further comprises a sulfide scavenger.

Embodiment 43 provides the method of any one of Embodiments 1-42, wherein the composition further comprises a corrosion inhibitor.

Embodiment 44 provides the method of any one of Embodiments 1-43, further comprising combining the acidizing composition with an aqueous or oil-based fluid comprising a stimulation fluid, fracturing fluid, spotting fluid, clean-up fluid, completion fluid, remedial treatment fluid, abandonment fluid, pill, acidizing fluid, packer fluid, logging fluid, or a combination thereof, to form a mixture, wherein the placing the composition in the subterranean formation comprises placing the mixture in the subterranean formation.

Embodiment 45 provides the method of any one of Embodiments 1-44, wherein at least one of prior to, during, and after the placing of the composition in the subterranean formation, the acidizing composition is used in the subterranean formation, at least one of alone and in combination with other materials, as a stimulation fluid, fracturing fluid, spotting fluid, clean-up fluid, completion fluid, remedial treatment fluid, abandonment fluid, pill, acidizing fluid, packer fluid, logging fluid, or a combination thereof.

Embodiment 46 provides the method of any one of Embodiments 1-45, wherein the acidizing composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 47 provides the method of any one of Embodiments 1-46, wherein the placing of the acidizing composition in the subterranean formation comprises fracturing at least part of the subterranean formation to form at least one subterranean fracture.

Embodiment 48 provides the method of any one of Embodiments 1-47, wherein the acidizing composition further comprises a proppant, a resin-coated proppant, or a combination thereof.

Embodiment 49 provides the method of any one of Embodiments 1-48, wherein the placing of the acidizing composition in the subterranean formation comprises pumping the acidizing composition through a tubular disposed in a wellbore and into the subterranean formation.

Embodiment 50 provides a system for performing the method of any one of Embodiments 1-49, the system comprising:

a tubular disposed in the subterranean formation; and a pump configured to pump the acidizing composition in the subterranean formation through the tubular.

Embodiment 51 provides a method of treating a subterranean formation, the method comprising:

placing in a subterranean formation an acidizing composition comprising an acid; and a compound having the structure:

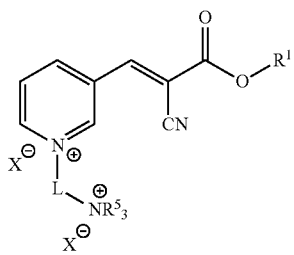

wherein $R^1$ is $(C_1-C_5)$alkyl,

L is $(C_1-C_{15})$alkylene, $R^5$ is $(C_1-C_5)$alkyl, and $X^-$ at each occurrence is independently selected from halide.

Embodiment 52 provides a method of treating a subterranean formation, the method comprising:

placing in a subterranean formation a composition comprising a compound having a structure chosen from:

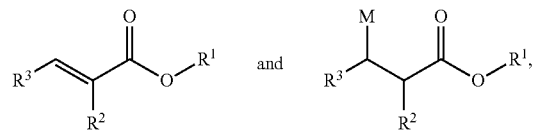

wherein $R^1$ at each occurrence is independently chosen from —H and substituted or unsubstituted $(C_1-C_{30})$hydrocarbyl, $R^2$ at each occurrence is independently chosen from —CN, $CONR^A{}_2$, and —$COOR^A$, wherein $R^A$ at each occurrence is independently chosen from —H and substituted or unsubstituted $(C_1-C_{30})$hydrocarbyl, $R^3$ at each occurrence is independently chosen from substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—, and M is a Michael-addition donor; and dissolving or removing a filter cake in the subterranean formation with the composition or a reaction product thereof.

Embodiment 53 provides a system comprising:

an acidizing composition comprising an acid; and a compound having a structure chosen from:

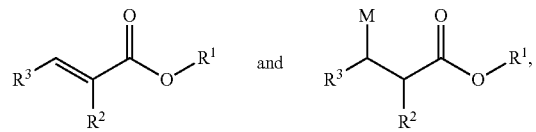

wherein $R^1$ at each occurrence is independently chosen from —H and substituted or unsubstituted $(C_1-C_{30})$hydrocarbyl, $R^2$ at each occurrence is independently chosen from —CN, $CONR^A{}_2$, and —$COOR^A$, wherein $R^A$ at each occurrence is independently chosen from —H and substituted or unsubstituted $(C_1-C_{30})$hydrocarbyl, $R^3$ at each occurrence is independently chosen from substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—, and M is a Michael-addition donor; and a subterranean formation comprising the composition therein.

Embodiment 54 provides the system of Embodiment 53, further comprising a tubular disposed in the subterranean formation; and a pump configured to pump the acidizing composition in the subterranean formation through the tubular.

Embodiment 55 provides an acidizing composition for treatment of a subterranean formation, the acidizing composition comprising:

37 an acid; and
a compound having a structure chosen from:

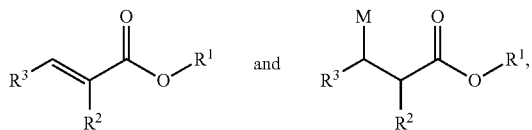

wherein
R¹ at each occurrence is independently chosen from —H and substituted or unsubstituted $(C_1-C_{30})$hydrocarbyl, R² at each occurrence is independently chosen from —CN, $CONR^A_2$, and —$COOR^A$, wherein $R^A$ at each occurrence is independently chosen from —H and substituted or unsubstituted $(C_1-C_{30})$hydrocarbyl, R³ at each occurrence is independently chosen from substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—, and M is a Michael-addition donor.

Embodiment 56 provides an acidizing composition for treatment of a subterranean formation, the acidizing composition comprising:
an acid; and
a compound having the structure:

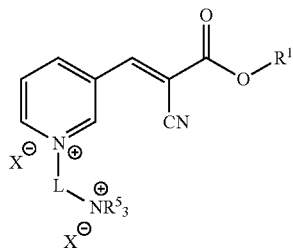

wherein
R¹ is $(C_1-C_5)$alkyl,
L is $(C_1-C_{15})$alkylene,
R⁵ is $(C_1-C_5)$alkyl, and
X⁻ at each occurrence is independently selected from halide.

Embodiment 57 provides a method of preparing an acidizing composition for treatment of a subterranean formation, the method comprising:
forming an acidizing composition comprising
an acid; and
a compound having a structure chosen from:

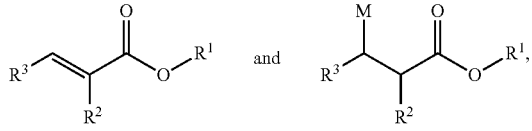

wherein
R¹ at each occurrence is independently chosen from —H and substituted or unsubstituted $(C_1-C_{30})$hydrocarbyl,

38

R² at each occurrence is independently chosen from —CN, $CONR^A_2$, and —$COOR^A$, wherein $R^A$ at each occurrence is independently chosen from —H and substituted or unsubstituted $(C_1-C_{30})$hydrocarbyl, R³ at each occurrence is independently chosen from substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—, and M is a Michael-addition donor.

Embodiment 58 provides the composition, method, or system of any one or any combination of Embodiments 1-57 optionally configured such that all elements or options recited are available to use or select from.

What is claimed is:
1. A method of treating a subterranean formation, comprising:
placing an acidizing composition into a subterranean formation, the acidizing composition forming a chelator in the subterranean formation, the acidizing composition comprising:
an acid; and
a compound providing formation of the chelator, the compound having the structure:

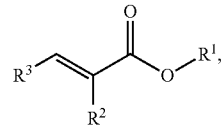

wherein:
R¹ at is selected from the group consisting of —H and substituted or unsubstituted $(C_1-C_{30})$hydrocarbyl,
R² at is selected from the group consisting of —CN, —$CONR^A_2$, and —$COOR^A$, wherein $R^A$ at each occurrence is independently selected from the group consisting of —H and substituted or unsubstituted $(C_1-C_{30})$hydrocarbyl, and
R³ is selected from the group consisting of substituted or unsubstituted $(C_1-C_{30})$hydrocarbyl, a substituted or unsubstituted $(C_1-C_{10})$heterocyclyl, and a $(C_1-C_{30})$hydrocarbyl substituted by a substituted or unsubstituted $(C_1-C_{10})$heterocyclyl and interrupted by 0, 1, 2, or 3 groups independently chosen from —O—, —S—, and substituted or unsubstituted —NH—.

2. The method of claim 1, further comprising
contacting the compound with a Michael-addition donor to form a second compound having the structure:

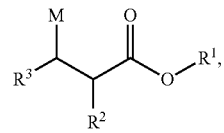

wherein the Michael-addition donor is represented by M-H before it contacts the compound and wherein M represents the Michael-addition donor after the second compound forms.

3. The method of claim 1, wherein about 1 wt % to about 5 wt % of the acidizing composition is the acid, and wherein the acid is at least one of hydrochloric acid, fluoric acid, acetic acid, and formic acid.

4. The method of claim 2, wherein about 0.01 wt % to about 10 wt % of the composition is the second compound.

5. The method of claim 1, wherein $R^1$ is selected from the group consisting of —H and $(C_1-C_5)$alkyl, wherein $R^2$ is selected from the group consisting of —CN and —COOR$^4$, and wherein $R^4$ is chosen from —H and $(C_1-C_5)$alkyl.

6. The method of claim 1, wherein $R^1$ is selected from the group consisting of methyl, ethyl, isopropyl, t-butyl, and n-butyl, wherein $R^2$ is —CN, and wherein $R^4$ is —H.

7. The method of claim 1, wherein:
   $R^3$ is $(C_1-C_{10})$heterocyclyl-L-$R^4$, wherein
      the $(C_1-C_{10})$heterocyclyl is further substituted or unsubstituted,
   L is selected from the group consisting of a bond and a $(C_1-C_{30})$hydrocarbylene interrupted by 0, 1, 2, or 3 groups independently selected from the group consisting of —O—, —S—, and substituted or unsubstituted —NH—, and
   $R^4$ is selected from the group consisting of —H and —N$^+$R$^5_3$X$^-$, wherein
      $R^5$ is substituted or unsubstituted $(C_1-C_{10})$alkyl and
      X$^-$ is a counterion.

8. The method of claim 7, wherein $R^3$ is

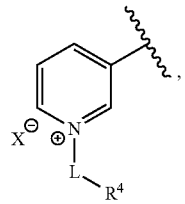

wherein X$^-$ is a counterion.

9. The method of claim 7, wherein
   L is selected from the group consisting of methylene, ethylene, propylene, butylene, pentylene, hexylene, heptylene, and octylene,
   $R^4$ is selected from the group consisting of —H and —N+R$^5_3$X$^-$, and wherein $R^5$ is substituted or unsubstituted $(C_1-C_5)$alkyl and
   X$^-$ is a halide.

10. The method of claim 2, wherein
    M is selected from —SH and —SR$^6$, wherein
    $R^6$ is a substituted or unsubstituted $(C_1-C_{30})$hydrocarbyl interrupted by 0, 1, 2, or 3 groups selected from the group consisting of —O—, —S—, and substituted or unsubstituted —NH—.

11. The method of claim 1, wherein the compound has a structure selected from the group consisting of:

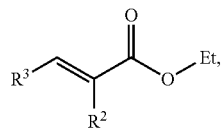

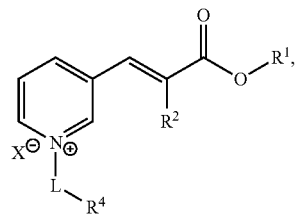

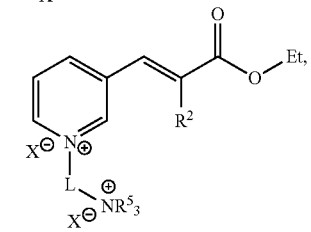

wherein L is selected from the group consisting of a bond and a $(C_1-C_{15})$hydrocarbylene, $R^4$ is selected from the group consisting of —H and —N$^+$R$^5_3$X$^-$, $R^5$ is $(C_1-C_5)$alkyl, and X$^-$ is a counterion.

12. The method of claim 10, wherein the compound has a structure selected from the group consisting of:

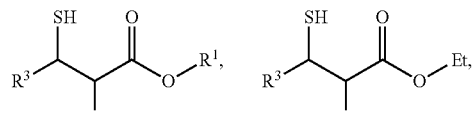

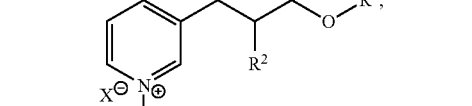

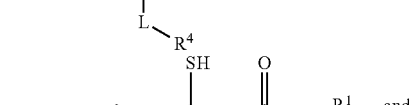

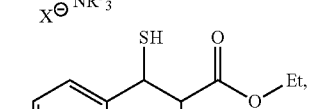

wherein
   L is selected from the group consisting of a bond and a $(C_1-C_{15})$hydrocarbylene,
   $R^4$ is selected from the group consisting of —H and —N+R$^5_3$X$^-$,
   $R^5$ is $(C_1-C_5)$alkyl, and
   X$^-$ is a counterion.

13. The method of claim 1, wherein the compound has a structure selected from the group consisting of:

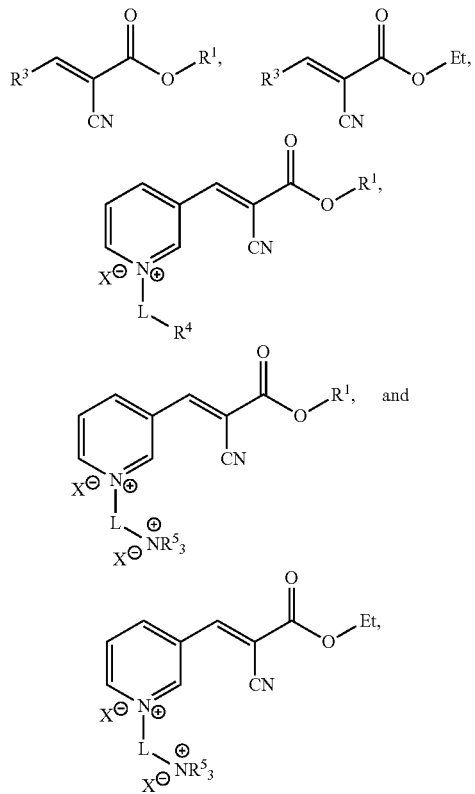

wherein
L is selected from the group consisting of a bond and a $(C_1$-$C_{15})$hydrocarbylene,
$R^4$ is selected from the group consisting of —H and —N$^+$R$^5_3$X$^-$, R$^5$ is $(C_1$-$C_5)$alkyl, and
X$^-$ is a counterion.

14. The method of claim 13, further comprising hydrolyzing the compound to yield the chelator, wherein the chelator is a second compound having a structure selected from the group consisting of:

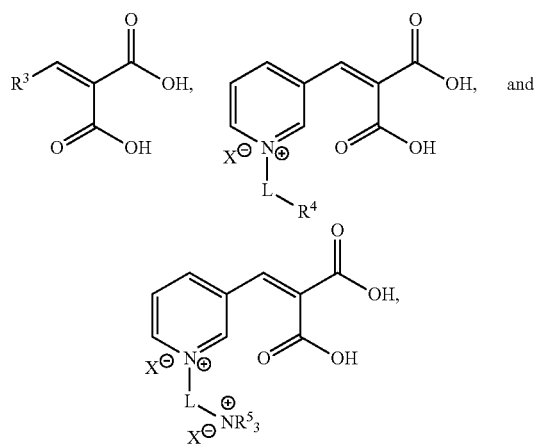

wherein
L is selected from the group consisting of a bond and a $(C_1$-$C_{15})$hydrocarbylene,
$R^4$ is selected from the group consisting of —H and —N$^+$R$^5_3$X$^-$,
R$^5$ is $(C_1$-$C_5)$alkyl, and
X$^-$ is a counterion.

15. The method of claim 12, further comprising hydrolyzing the second compound to yield the chelator, wherein the chelator is a third compound having a structure selected from the group consisting of:

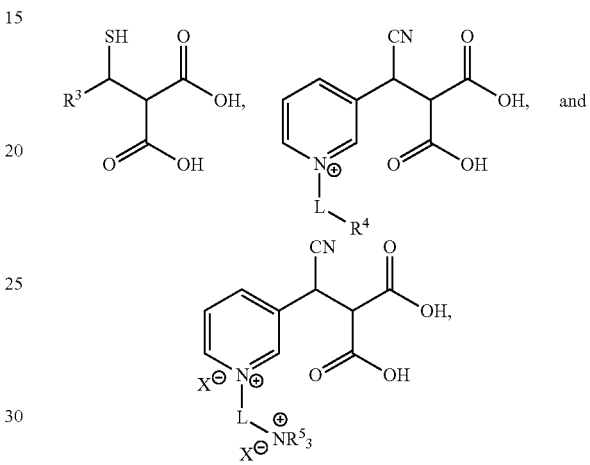

wherein
L is selected from the group consisting of a bond and a $(C_1$-$C_{15})$hydrocarbylene,
$R^4$ is selected from the group consisting of —H and —N$^+$R$^5_3$X$^-$,
R$^5$ is $(C_1$-$C_5)$alkyl, and
X$^-$ is a counterion.

16. The method of claim 1, wherein the compound further is an agent selected from the group consisting of a sulfide scavenger, a corrosion inhibitor, and any combination thereof.

17. The method of claim 1, wherein the placing of the acidizing composition in the subterranean formation comprises fracturing at least part of the subterranean formation to form at least one subterranean fracture, and wherein the acidizing composition further comprises a proppant.

18. A system for performing the method of claim 1, the system comprising:
a tubular disposed in the subterranean formation; and
a pump configured to pump the acidizing composition in the subterranean formation through the tubular.

19. A method of treating a subterranean formation, comprising:
placing an acidizing composition in a subterranean formation, the acidizing composition forming a chelator in the subterranean formation, the acidizing composition comprises:
an acid; and
a compound providing formation of the chelator, the compound having the structure:

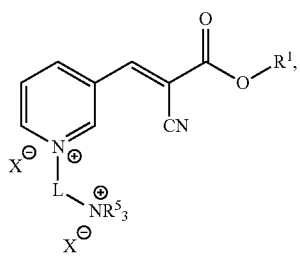

wherein:
R¹ is $(C_1-C_5)$alkyl,
L is $(C_1-C_{15})$alkylene,
R⁵ is $(C_1-C_5)$alkyl, and
X⁻ at each occurrence is a halide.

20. An acidizing composition for treating a subterranean formation, the acidizing composition forming a chelator in the subterranean formation, the acidizing composition comprising:
an acid; and
a compound providing formation of the chelator, the compound having the structure:

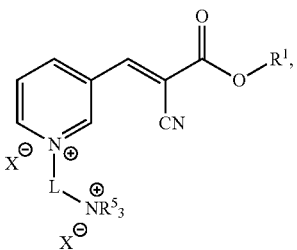

wherein:
R¹ is $(C_1-C_5)$alkyl,
L is $(C_1-C_{15})$alkylene,
R⁵ is $(C_1-C_5)$alkyl, and
X⁻ at each occurrence is a halide.

* * * * *